United States Patent [19]

Meschnig

[11] 4,294,570
[45] Oct. 13, 1981

[54] LOCKABLE CAP SCREW

[76] Inventor: Albin Meschnig, Müllnern 72 (Kärnten), A-9585 Gödersdorf, Austria

[21] Appl. No.: 13,659

[22] Filed: Feb. 21, 1979

[30] Foreign Application Priority Data

Mar. 7, 1978 [AT] Austria .................................. 1638/78
Oct. 30, 1978 [SE] Sweden ................................ 7811221

[51] Int. Cl.³ .............................................. F16B 39/00
[52] U.S. Cl. .................................... 411/103; 411/180; 411/294
[58] Field of Search ................... 151/9, 24, 26, 27, 28, 151/41.73; 85/23, 27, 66

[56] References Cited

U.S. PATENT DOCUMENTS

| | | | |
|---|---|---|---|
| 719,036 | 11/1903 | Pederson | 85/27 |
| 791,373 | 5/1905 | Shaffer | 85/23 |
| 977,795 | 12/1910 | Gronke et al. | 85/23 |
| 1,162,266 | 11/1915 | Weiss | 85/23 |
| 1,175,824 | 3/1916 | Roznowski | 85/23 |
| 3,390,712 | 7/1968 | McKay | 151/24 |
| 3,865,307 | 2/1975 | Schiro | 85/23 X |

FOREIGN PATENT DOCUMENTS

| | | | |
|---|---|---|---|
| 62170 | 9/1939 | Norway | 151/24 |
| 456096 | 2/1975 | U.S.S.R. | 151/24 |

Primary Examiner—Thomas J. Holko
Attorney, Agent, or Firm—Martin A. Farber

[57] ABSTRACT

A lockable cap screw comprises at one pin which is coupled to an actuating member and by means of the latter can be shifted to an operative position, in which the pin protrudes outwardly and from said operative position back to a position of rest, in which the entire pin is disposed within the head of the screw.

13 Claims, 7 Drawing Figures

LOCKABLE CAP SCREW

This invention relates to a lockable cap screw having a head which is formed with a bore, which opens in the outside peripheral surface of the head, and a pin, which is slidable in said bore between a position of rest and an operative position, in which the outer end of the pin protrudes over the outside peripheral surface of the head of the screw.

Means for preventing a rotation of wood screws of that kind are described in French Pat. No. 949,733. French Pat. No. 949,733 does not disclose separate means for actuating the locking pins but it is contemplated therein to push the locking pins to their operative position by hammer blows. When it is desired to release the known means for preventing rotation, a screwdriver is to be used as a lever in accordance with French Pat. 949,733.

It is an object of the invention to provide a cap screw which is of the kind described first hereinbefore and which is simple in structure and operation and nevertheless ensures an effective locking.

This is accomplished according to the invention in that an actuating member for shifting the pin to its operative position is provided and engages the inner end of the pin and is adjustable relative to the head of the screw and the inner end of the pin is angled and enters an opening of the actuating member. When the head of the screw is in the desired position, e.g., when the cap screw has been rotated to the desired position, the actuating member is adjusted so that the pins move to their operative position, in which they lock the screw in position relative to the surrounding object by clamping or notch action. Another advantage afforded by the invention over the subject matter of French Pat. No. 949,733 resides in that the lock can easily be eliminated by the actuating member at any time when it is desired to change the position of the head of the screw, e.g., when the cap screw is to be rotated for a re-adjustment.

Within the scope of the invention it will be desirable to provide a curved pin and preferably a curved bore, which are so arranged that the concave side of the curvature faces the outside peripheral surface. That design ensures particularly desirable conditions for the shifting movement of the pins.

In a space-saving arrangement, the pin in position of rest is received in part by an outwardly open groove of the actuating member.

In a preferred embodiment, the actuating member has a substantially circular cylindrical outside peripheral surface and is received in a substantially circular cylindrical opening of the head of the screw and the angled inner end of the pin is received in an opening which is open to the outside peripheral surface of the actuating member. This embodiment affords the advantage that the actuating member need only be rotated to shift the pins. In that connection it has proved particularly desirable to arrange the bore in the head of the screw so that said bore is oblique to a radial plane of the actuating member.

In a further embodiment of the invention, the angled inner end of the pin comprises a pin-shaped coupling element, which extends through a transverse bore of the pin and through a bore of the actuating member, and the inner end of the pin is received in a groove, which is open to the peripheral surface of the actuating member and defined by flanges on both sides.

Because the angled portion comprises, in accordance with the invention, a pin-shaped coupling element, which extends through bores in the pin and in the actuating member, the structure and assembling of the screw according to the invention are simplified.

Since the inner end of the pin is received in a groove, which is formed in the actuating member and defined by flanges on both sides, the actuating member is retained in the head of the screw directly by the pin, without need for additional measures.

Within the scope of the invention, the actuating member having a substantially circular cylindrical outside peripheral surface and received in a substantially circular cylindrical opening in the head of the screw may be provided on its outer end face with a slot for engagement by a screwdriver, which slot is aligned with two slots in the head of the screw when the pins are in position of rest. That embodiment permits of a particularly simple actuation because a screw driver having a blade width which corresponds to the diameter of the head of the screw may be used to rotate the head of the screw and the actuating member in unison to the desired position. A narrower screw driver having a width not in excess of the diameter of the actuating member may then be used to rotate only the actuating member in order to shift the pin to its operative position.

Within the scope of the invention, the bore formed in the head of the screw and receiving the pin may taper towards the outside peripheral surface of said head to an inside width which corresponds approximately to the cross-section of the pin, one surface defining the bore may be tangential to the circular cylindrical opening in the head of the screw and the opposite surface may be radial with respect to the head of the screw. Even if the pin is not curved, this embodiment ensures a desirable movement during the shifting of the pin to its operative position. Besides, the rotation of the actuating member is limited by the engagement of the pin to that surface which defines the bore and is radial with respect to the head of the screw. For this reason, special care is not required to move the acutating member to the position in which the pin protrudes most from the outside peripheral surface of the head of the screw.

The depth to which the outer end of the pin penetrates the object to be engaged with the pin will depend on the properties of said object. To facilitate the penetration or, if the pin engages an object of hard material, to increase the friction, the outer end of the pin may be pointed or provided with a knife edge or the like or with a friction-increasing extension, within the scope of the invention.

Finally within the scope of the invention, at least the outer end of the pin may be platelike and carry a plurality of pointed teeth, which are preferably staggered at least in the axial direction of the head of the screw. In this embodiment the risk of a splitting of the object to which the head of the screw is to be locked is much reduced.

The invention will now be explained more fully with reference to the accompanying drawings showing illustrative embodiments.

Figure 1:
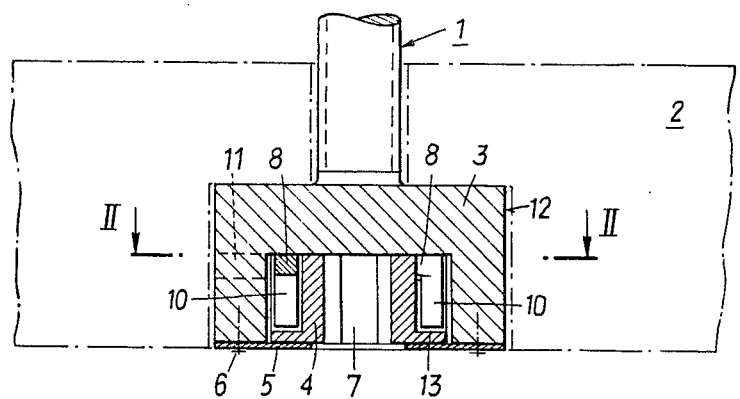
FIG. 1 is an axial sectional view showing a lockable cap screw according to the invention, FIG. 2 a sectional view taken on line II—II in FIG. 1, FIG. 3 a sectional view taken on line III—III in FIG. 2, FIG. 4 an axial sectional view showing a lockable cap screw according to another embodiment of the invention, and FIG. 5 a sectional view taken on line II'II in FIG. 4.

FIG. 1 shows a cap screw 1 which is used, e.g., to secure panels 2 of a suspended ceiling. For that purpose the head 3 of the cap screw 1 must be fixed relative to the panels 2 when the cap screw 1 has been rotated to move the panel 2 to the proper elevation.

A substantially circular cylindrical actuating member 4 is rotatably mounted in a central opening in the head 3 of the screw. A disc 5 is secured to the head 3 of the screw, e.g., by screws 6, and prevents the actuating member 4 from falling out. The actuating member 4 has a hexagonal opening 7, which is engageable by a key for actuating the actuating member 4.

Four pins 8 are slidably mounted in bores 11 of the head 3 of the screw. The pins 8 and the bores 11 are curved. The concave side of the curvature faces the outside peripheral surface 12 of the head 3 of the screw. When the pins 8 are in position of rest, their outer ends 9 are disposed within the outside peripheral surface 12 so that the head 3 of the cap screw 1 and the entire cap screw can be freely rotated in the panel 2.

The inner ends 10 of the pins 8 are angled and received in groovelike openings 13, which are open to the outside peripheral surface 14 of the actuating member 4 and extend parallel to its axis of rotation. In position of rest, parts of the pins extend into outwardly open grooves 15 of the actuating member 4 so that space is saved (FIG. 2).

Figure 2:
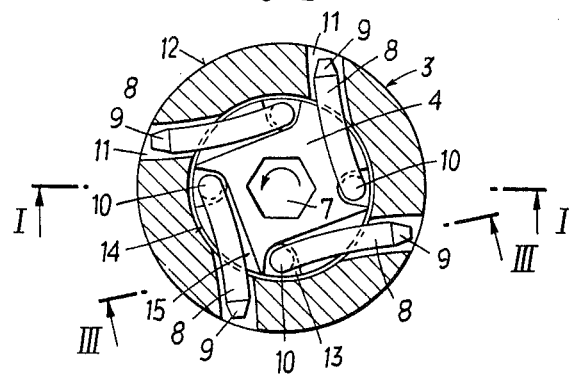
Figure 3:
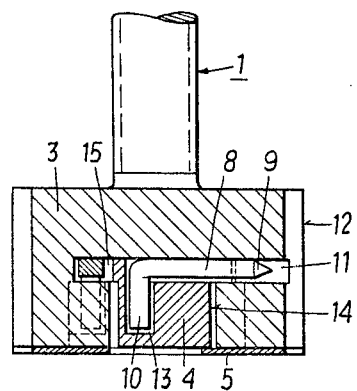

When the actuating member 4 is rotated relative to the head 3 of the screw in the direction of the arrow shown in FIG. 2, the pins 8 having angled inner ends 10, which enter the openings 13, are shifted downwardly to their operative position in which the outer ends 9 of the pins protrude from the outside peripheral surface 12 of the head 3 of the screw. Depending on the nature of the material forming the panel 2, the pins 8 will penetrate the panel 2 to a larger or smaller depth. The ends 9 of the pins are, e.g., pointed or formed with a knife edge. If the panel 2 is made from hard material, the outer ends 9 of the pins 8 may be provided with a friction-increasing extension, e.g., of rubber or the like.

By a rotation of the actuating member 4 opposite to the direction of the arrow shown in FIG. 2, the pins 8 are retracted to their operative position so that the head 3 of the screw can readily be rotated relative to the panel 2.

Whereas four pins 8 are provided in the illustrative embodiment shown, it will be sufficient, in principle, to provide a single pin for preventing a rotation of the head of the cap screw relative to an object such as a panel 2 of a suspended ceiling. For higher safety, however, two or more pins will usually be provided and will preferably by symmetrically arranged.

In an embodiment which is not shown, the pins 8 are enlarged in width at their outer ends and provided therewith a plurality of outwardly directed teeth. In that embodiment, the enlarged end of the pins 8 may lie in a plane which is inclined to the axis of the head of the screw 3 so that the teeth engage the panel 2 at points spaced apart in a substantial vertical region. The pin may be enlarged in width throughout its length and in that case too the plane of the pin may be inclined with respect to the axis of the head 3 of the screw.

Figure 4:
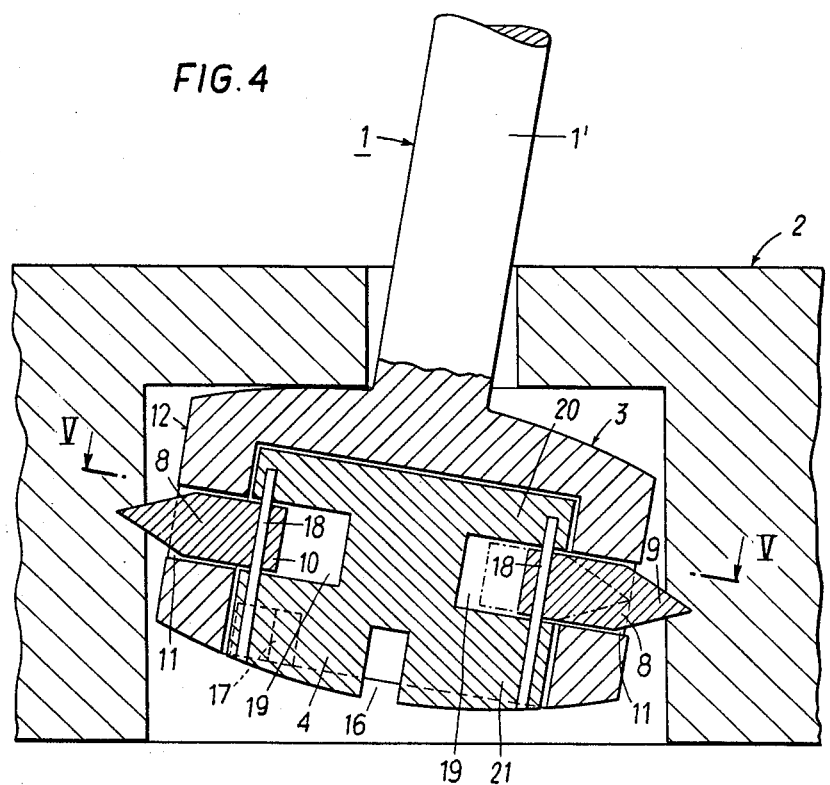

The cap screw 1 shown in FIG. 4 serves, e.g., to secure panels 2 of a suspended ceiling. For that purpose the head 3 of the cap screw 1 must be fixed relative to the panels 2 as soon as the panel 2 has been adjusted to the correct elevation by a corresponding rotation of the cap screw 1.

The shaft 1' of the cap screw 1 may be integral with the head 3 of the screw, as is shown in FIG. 4, or may consist of a screw-threaded rod, which is screwed into the head 3 of the screw.

The head 3 of the screw has convexly curved end faces so that it will not protrude from the underside of the panel 2 even if the latter is thin and the shaft 1' of the cap screw 1 is inclined, as shown in FIG. 4.

A substantially circular cylindrical actuating member 4 is rotatably mounted in a central opening in the head 3 of the screw. The outer end face of the actuating member 4 is also convexly curved.

Two pins 8 are slidably mounted in bores 11 of the head 3 of the screw. When the pins 8 are in position of rest, indicated in phantom in FIG. 5, the outer ends 9 of the pins 8 are disposed within the outside peripheral surface 12 of the head 3 so that the latter and the entire cap screw 1 can freely be rotated in the panel. For this purpose the actuating member 4 has a slot 16, which is continued at both ends by slots 17 when the pins 8 are in position of rest. A screwdriver having a blade width equal to the diameter of the head 3 of the screw can be inserted into the slot 16 and the slots 17 may be used to rotate the head of the screw and the actuating member in unison so as to move the cap screw 1 to the desired angular position. When it is desired to rotate only the actuating member 4, a correspondingly narrower screwdriver is inserted only into the slot 16 of the actuating member 4. During this operation a tool can be inserted into the slots 17 to retain the head 3 of the screw in position when this is required.

The inner ends 10 of the pins 8 comprise pin-shaped coupling elements 18, which extend through a bore in the pin 8 and bores in the actuating member 4 and couple the pins to the actuating member. The inner ends 10 of the pins 8 are also received in a groove 19, which is open to the outside peripheral surface 14 of the actuating member 4 so that the inner ends 10 of the pins 8 lie between the flanges 20 and 21 of the actuating member 4 which define the groove 19. As a result, the actuating member 4 is retained in the head 3 of the screw without need for additional measures.

Figure 5:
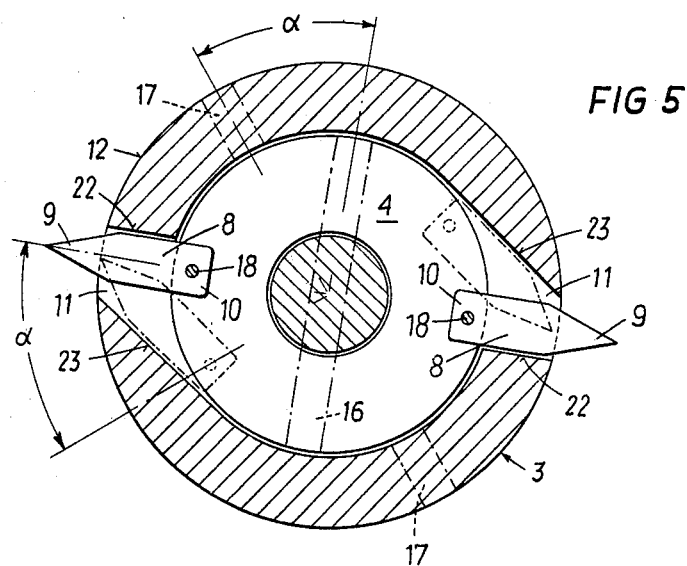

The special design of the bores 11 which are formed in the head 3 of the screw and receive the pins 8 is shown in FIG. 5. Each bore 11 is defined by a surface 22 which is radial with respect to the head 3 of the screw, and by a surface 23 which is tangential to the actuating member 5. It is also apparent from FIG. 5 that in position of rest the pins 8 engage the tangential surface 23 and that they engage the radial surface 22 when the actuating member 4 has been rotated through the angle $\alpha$. As a result, the pins 8 can easily be shifted and the rotation of the actuating member 4 relative to the head 3 of the screw is limited.

It is apparent also from FIG. 5 that when the pins 8 are in operative position the slot 16 in the actuating member 4 is spaced by the angle $\alpha$ from the slot 17. In other words, the slot 16 is aligned with the slots 17 when the pins 8 are in operative position.

In the embodiment shown by way of example in FIGS. 4 and 5, the pins 8 have pointed outer ends. Different ends may be used, depending on the material of the panel 2. For instance, the pins 8 may be provided at their outer ends with friction-increasing extensions or with multiple teeth, such as have been described hereinbefore.

The actuating member 4 can be rotated to retract the pins 8 to their position of rest so that the head 3 of the screw can then readily be rotated relative to the panel 2.

Two pins 8 are provided in the embodiment shown by way of example in FIGS. 4 and 5 but in principle a single pin 8 is sufficient. For higher safety, two or more pins will usually be provided.

Figure 6:
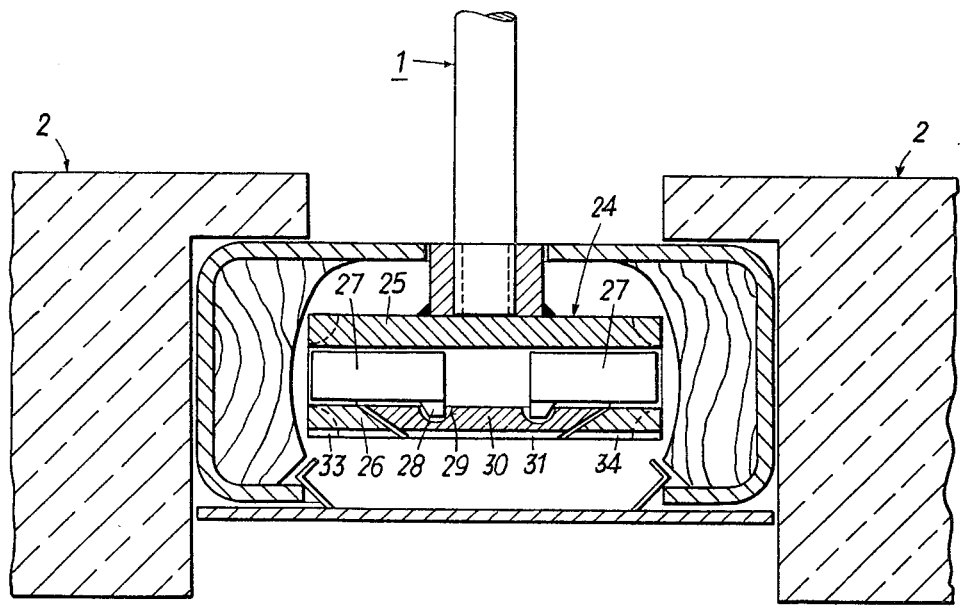
FIGS. 6 and 7 show another embodiment of the lockable cap screw.
Figure 7:
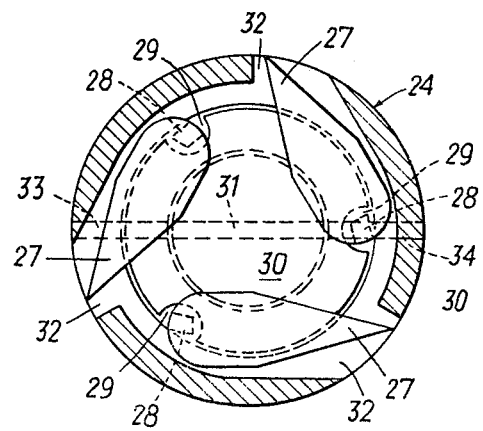

In the embodiment shown in FIGS. 6 and 7, the head 24 of the screw consists of two half-shells 25 and 26. Three pins 27 are slidably mounted in the head 24 of the screw and at their inner ends have extensions 28, which correspond to the angled portions of the pins 8 of FIG. 2 and are received in opening 29 of an actuating member 30. The latter is rotatably mounted in an opening of the half-shell 26. A screwdriver or the like, e.g., can be inserted into an actuating slot 31 of the actuating member 30 and can be used to rotate the latter so that the pins are pushed out of the head 24 through the opening 32 and are retracted when this is required. The half-shell 26 is also provided with slots 33 and 34, which serve to rotate the entire head 24 of the screw in order to adjust the elevation of the panel 2. This is also possible with the embodiment shown in FIGS. 4 and 5.

I claim:

1. A lockable cap screw having a head formed with a bore opening in an outside peripheral surface of the head, and a pin slidable in said bore between a position of rest and an operative position in which an outer end of the pin protrudes over the outside peripheral surface of the head of the screw, comprising means, comprising an actuating member engaging an inner end of the pin and being adjustable relative to the head of the screw, for shifting the pin to said operative position, said actuating member is formed with an opening, and the inner end of said pin is angled and enters said opening of the actuating member, the bore in the head of the screw is oblique to a radial plane of the actuating member.

2. A lockable cap screw according to claim 1, characterized in that the pin and preferably also the bore are curved and are concave towards the outside peripheral surface of the head of the screw.

3. A lockable cap screw according to claim 1, characterized in that the pin in position of rest is received in part by an outwardly open groove of the actuating member.

4. The lockable cap screw according to claim 3, wherein said actuating member forms an opening means for being operatively engaged by a tool for turning said actuating member.

5. A lockable cap screw according to claim 1, characterized in that the actuating member has a substantially circular cylindrical outside peripheral surface and is received in a substantially circular cylindrical opening of the head of the screw and the angled inner end of the pin is received in said opening which is open to the outside peripheral surface of the actuating member.

6. A lockable cap screw according to claim 5, wherein said angled inner end of the pin comprises an inner portion and a pin-shaped coupling element which extends through a transverse bore of the inner portion of the pin and through said opening of the actuating member, said actuating member includes flanges on opposite sides defining a groove therebetween, open to a peripheral surface of said actuating member, and the inner portion of the pin is received in said groove in the actuating member.

7. A lockable cap screw according to claims 5 or 6, wherein
    the actuating member is provided on an outer end face with a slot means for engagement by a screwdriver, said slot means is aligned with two slots formed in the head of the screw when the pins are in position of rest.

8. A lockable cap screw according to claim 7, characterized in that the bore formed in the head of the screw and receiving the pin tapers toward the outside peripheral surface of said head to an inside width which corresponds approximately to the cross-section of the pin, one surface defining the bore is tangential to the circular cylindrical opening in the head of the screw and the opposite surface is radial with respect to the head of the screw.

9. The lockable cap screw according to claim 7, wherein said actuating member has a substantially circular cylindrical outer peripheral surface, the head of the screw is formed with a substantially circular cylindrical opening in which the outer peripheral surface of the actuating member is disposed.

10. A lockable cap screw according to claim 5, wherein the outer end of the pin is pointed.

11. The lockable cap screw according to claim 5, wherein the outer end of the pin is formed with a knife edge.

12. The lockable cap screw according to claim 5, further comprising means for increasing friction on the outer end of the pin.

13. A lockable cap screw having a head formed with a bore opening in an outside peripheral surface of the head, and a pin slidable in said bore between a position of rest and an operative position in which an outer end of the pin protrudes over the outside peripheral surface of the head of the screw, comprising means, comprising an actuating member engaging an inner end of the pin and being adjustable relative to the head of the screw, for shifting the pin to said operative position, said actuating member is formed with an opening, and the inner end of said pin is angled and enters said opening of the actuating member, the actuating member is provided on an outer end face with a slot means for engagement by a screwdriver, said slot means is aligned with two slots formed in the head of the screw when the pins are in the position of rest, the bore formed in the head of the screw and receiving the pin tapers towards the outside peripheral surface of said head to an inside width which corresponds approximately to the cross-section of the pin, one surface defining the bore is tangential with respect to the head of the screw and the opposite surface defining the bore is radial with respect to the head of the screw.

* * * * *